MACHINE FOR VERIFYING PERFORATED RECORD CARDS

Filed March 28, 1947 4 Sheets-Sheet 1

Inventors
ARTHUR THOMAS
FREDERICK SIDNEY RHODES
MAURICE RICHARD BROWN

BY THEIR J. L. Sterling Attorney

July 18, 1950 A. THOMAS ET AL 2,516,033

MACHINE FOR VERIFYING PERFORATED RECORD CARDS

Filed March 28, 1947 4 Sheets-Sheet 2

*Inventors*
ARTHUR THOMAS
FREDERICK SIDNEY RHODES
MAURICE RICHARD BROWN

BY THEIR *Attorney*

July 18, 1950 A. THOMAS ET AL 2,516,033

MACHINE FOR VERIFYING PERFORATED RECORD CARDS

Filed March 28, 1947 4 Sheets-Sheet 3

Inventors
ARTHUR THOMAS
FREDERICK SIDNEY RHODES
MAURICE RICHARD BROWN

BY THEIR J. L. Sterling Attorney

MACHINE FOR VERIFYING PERFORATED RECORD CARDS

Filed March 28, 1947 4 Sheets-Sheet 4

Inventors
ARTHUR THOMAS
FREDERICK SIDNEY RHODES
MAURICE RICHARD BROWN
BY THEIR [signature] Attorney Patented July 18, 1950 2,516,033

UNITED STATES PATENT OFFICE 2,516,033

MACHINE FOR VERIFYING PERFORATED RECORD CARDS

Arthur Thomas, Wallington, Frederick Sidney Rhodes, Thornton Heath, and Maurice Richard Brown, Putney, London, England, assignors to Powers-Samas Accounting Machines Limited, London, England, a British company Application March 28, 1947, Serial No. 737,988
In Great Britain April 1, 1946

7 Claims. (Cl. 73—156)

This invention relates to machines for verifying statistical record cards.

In British Patent Specification No. 430,251 there is described a machine for verifying standard cards in which each character to be recorded is represented by a single hole punched in a particular one of twelve index positions in a column of the card, said machine being capable of indicating not only whether a perforation is incorrectly placed in a card, but also if an erroneous perforation exists in the same column as a correctly placed perforation.

In order to increase the card capacity, it is customary to divide the card by an imaginary line longitudinally into upper and lower zones each containing a number of zonal columns equal to the number of full columns in the undivided card, but each of half the length of a full column, and to record data in such zonal columns by punching either one, or two, holes in each zonal column, in accordance with a pre-determined code.

The present invention has for its main object to provide a modification of the form of machine disclosed in Specification No. 430,251 which will be capable of verifying either the upper or the lower zone of such a card at the will of the operator.

To this end according to the present invention a machine for verifying the data perforated in statistical record cards of the kind divided into upper and lower zones may comprise a column of settable elements allocated to each zone, each of said columns containing as many settable elements as there are index positions in a zonal column of the card, a zonal column of sensing pins corresponding to each column of settable elements, each of said zonal columns of sensing pins being independently operable to sense a column of its associated zone, and serving, when so operated, to set the corresponding zonal column of settable elements in accordance with the perforations in the sensed zonal column, a group of actuators allocated to each zone, one actuator to each index position in the corresponding zone and each actuator of any zone serving, when operated, to actuate all the sensing pins of the associated zone, and a single group of keys for operating both groups of actuators, said group of keys being displaceable as a whole out of co-operative relation with one group of actuators and into co-operative relation with the other group and vice versa, each key being depressible for operating one or more actuators of the group in cooperative relation with said group of keys and a testing member allocated to each settable element, each operable by the corresponding actuator to test the position of its respective settable element and give an indication as to whether said position is correct.

Preferably, as in the machine of Specification No. 430,251 the registering elements are integral with the sensing pins, each having a recess to co-operate with the testing members in the manner described in the aforesaid Specification No. 430,251, the indication of an error being given by the failure of the escapement mechanism to operate, accompanied by consequent inability of the operator to effect full depression of the key which is being actuated.

In order that the invention may be more completely understood, one construction according thereto will now be described by way of example, with reference to the accompanying drawing in which.

Figure 1:
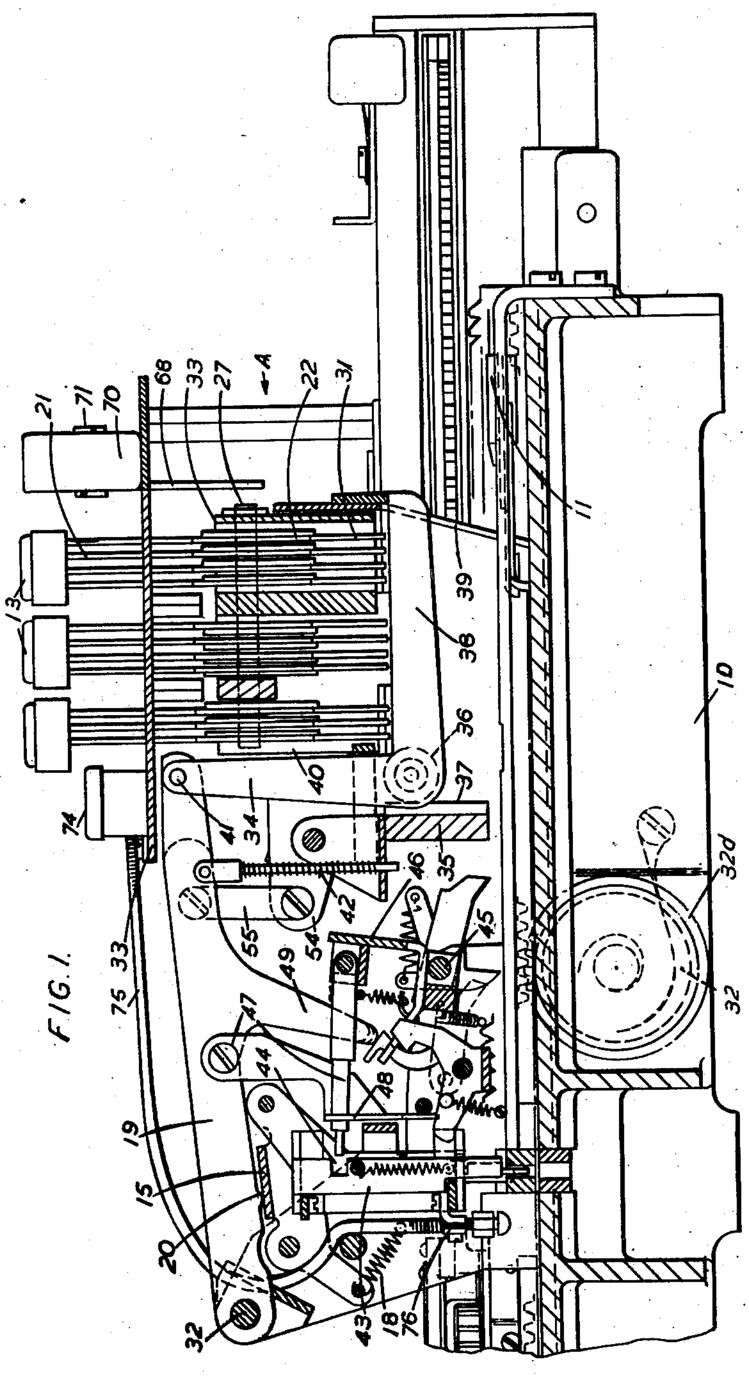
Fig. 1 is a side view, partly in section, of verifying mechanism according to the invention.
Figure 2:
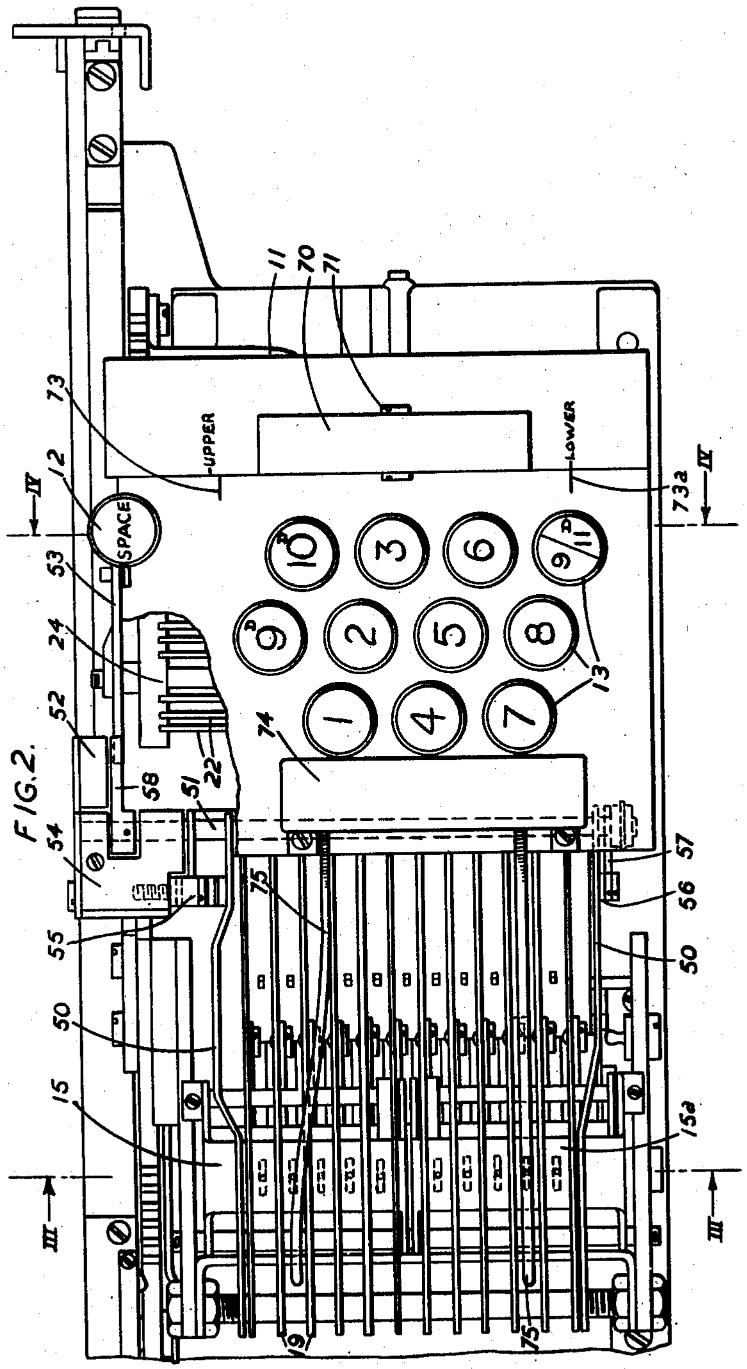
Fig. 2 is a plan of Fig. 1, some parts being omitted for the sake of clarity.
Figures 3, 4:
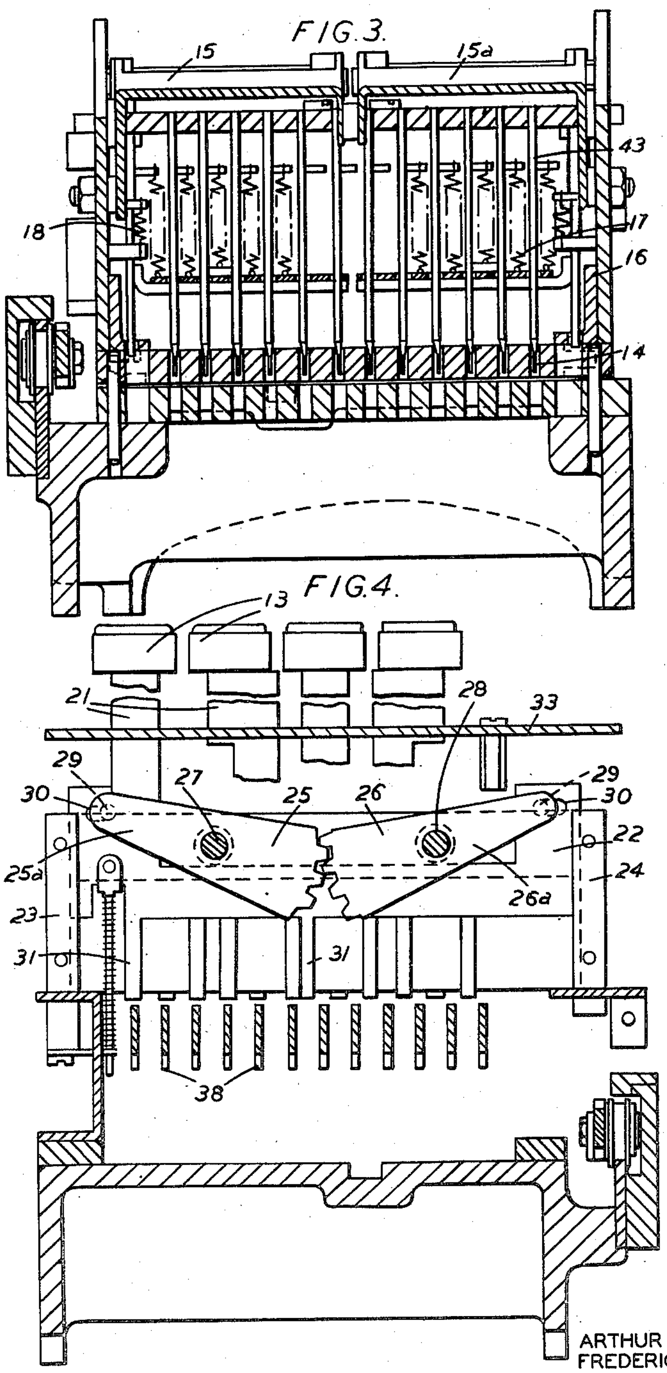
Fig. 3 is a section on the line III—III of Fig. 2.
Fig. 4 is a section on the line IV—IV of Fig. 2, some parts being omitted for clarity.
Figure 5:
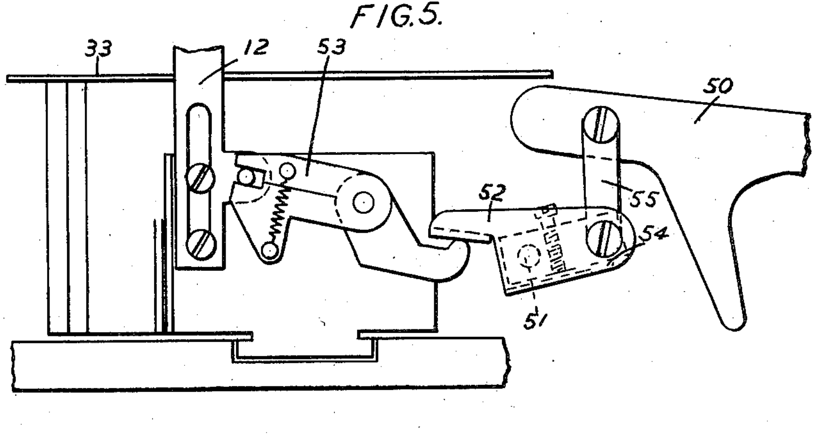
Fig. 5 shows a detail of the operating mechanism.
Figure 6:
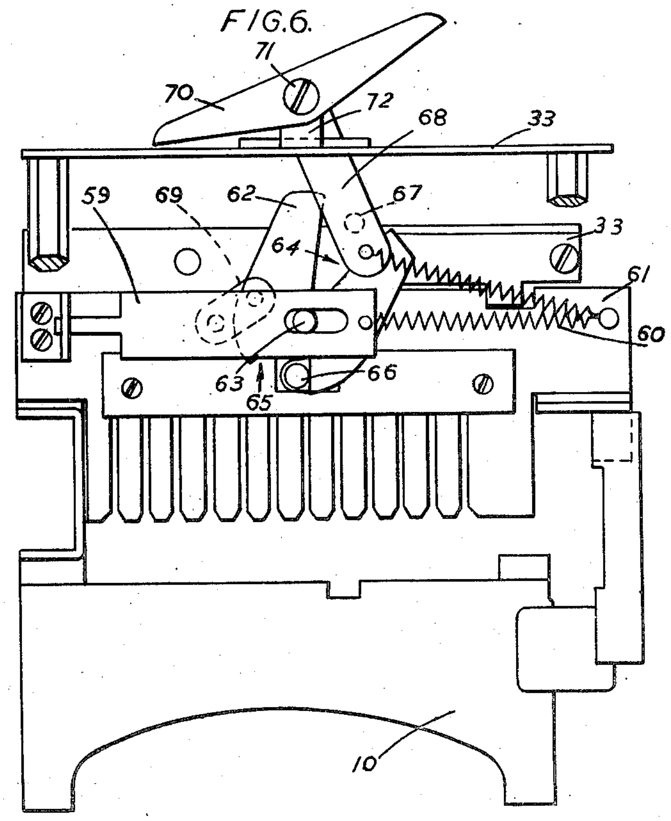
Fig. 6 is an end view looking in the direction of arrow A Fig. 1, some parts being omitted for clarity.

Referring to the drawings, the machine comprises a base 10 having a card carriage 11 operated step by step on depression of a key 12 by an escapement mechanism similar to that described in British Patent Specification No. 430,251.

The machine is intended for use with cards which are divided longitudinally by an imaginary line into an upper and a lower zone, each zone having six index point positions in each column thereof.

In order to represent a number, combination punching is used in which the even numbers are represented by a single hole and each odd number is represented by one of said single holes and a control hole in the same column.

The machine now being described is intended for use for cards punched with sterling amounts, the code employed being such that five of the holes in the zonal column represent the digits 2d, 4d, 6d, 8d and 10d, while the digits 1d, 3d, 5d, 7d and 9d are represented by the 2d, 4d, 6d, 8d, and 10d holes respectively together with a control hole in the sixth position, this control hole by itself representing 11d.

Accordingly, the machine is provided with eleven keys 13 representing the digits 1d to 11d respectively, the amount zero pence not being punched in the card.

Across the machine is disposed a full column of sensing pins 14, which is divided into two half columns, each containing six pins, that is to say, a number of pins equal to the number of index point positions in each zonal column of the card.

Each of these two half columns of sensing pins is carried in a frame 15, 15*a* adapted to slide vertically in guides 16 and to which the pins 14 are connected by springs 17 tending to pull them downwardly, the entire frames 15, 15*a* being normally held in uppermost position by springs 18.

As will be explained later, in the operation of the machine, one of these frames is depressed to sense one zone of the card and the other frame is depressed when it is required to sense the other zone. Accordingly, the following construction is provided to enable either of the pin-carrying frames to be actuated from the single group of keys 13 which constitutes a common actuating means for both of the pin-carrying frames 15, 15*a*.

To this end, there is provided a pivoted actuating lever 19 for each position in each zonal column, that is to say, there are six actuating levers for the upper zone and six actuating levers for the lower zone.

Each upper zone actuating lever 19 carries a downward projection 20 normally resting on the top of the corresponding pin-carrying frame so that when any one of these size zones actuating levers is operated, the upper zone pin-carrying frame is lowered.

Similarly, each lower zone actuating lever carries a downward projection normally resting on the top of the lower zone pin-carrying frame, so that when any lower zone actuating lever is operated, the lower zone pin-carrying frame is depressed.

It will be understood that owing to the code punching referred to above, some of the keys have to operate two actuating levers, for example the 3d key has to operate the 4d and 11d actuating levers and, further, this same 3d key must be able to actuate either the 4d and 11d actuating levers in the upper zone or the 4d and 11d actuating levers in the lower zone at the will of the operator.

To this end, each key is attached to a lug 21 upstanding from a horizontal slide 22 which is guided at each end in guides 23, 24 for free vertical movement and is maintained horizontal during such movement by the following means.

Disposed adjacent to each slide 22 and in a plane parallel thereto are two intermeshing toothed segments 25, 26 mounted to rock about fixed pivots 27, 28. Each segment extends beyond its pivot towards one end of the associated slide 22, the teeth of the segments intermeshing at about the middle of the slide. The extension 25*a*, 26*a* of each segment is connected to the adjacent end of the slide 22 by means of a pin 29 and slot 30 and the arrangement is such that these two pin and slot connections are in the same horizontal plane.

Each of the key slides 22 corresponding to an odd numbered key, except the 11d slide, has two depending lugs 31 for operating the appropriate two actuating levers 19 in the lower zone and two further depending lugs for operating the appropriate two actuating levers in the upper zone.

The 11d key slide, like the even-numbered slides, has only two depending lugs, one for operating the lower zone 11d actuating lever, the other for operating the upper zone 11d actuating lever.

The depending lugs of the key slides operate the respective actuating levers through L-shaped transmission elements arranged as described below.

Each actuating lever is pivoted at 32 to the machine frame and extends across the sensing pin-carrying frame 15 for the corresponding zone, its free end being adjacent to the key-carrying frame 33. The actuating levers are thus mounted in a manner similar to that of the key levers 10 described in British Patent Specification No. 430,251.

To the free end of each actuating lever 19 is pivoted the upper end of the upwardly extending limb 34 of one of the L-shaped transmission elements above referred to. The bottom of the upwardly extending limb of each L-shaped element is freely guided in a comb bar 35, and carries a roller 36, which runs on a vertical face 37 of the comb bar 35, and the outer ends of their laterally extending limbs 38 are guided in another comb bar 39. A cross bar 40 running along the inside faces of all the upwardly extending limbs 34 keeps them in position. Each L-shaped element being pivoted at 41 to the horizontal actuating lever 19, and being guided by the roller 36 at the bottom of the vertical limb, the horizontal limb moves up and down while remaining approximately horizontal.

The actuating levers 19 are so mounted that their movements above and below the horizontal are approximately equal, and each L-shaped transmission element is arranged with its laterally extending limb 38 horizontal when the corresponding actuating lever 19 is in its uppermost position to which it is urged by a spring 42. Accordingly, when the actuating levers are in their lowermost positions the laterally extending limbs 38 of the corresponding L-shaped elements are still horizontal although to the middle of the stroke of the actuating levers some slight departure of the L-shaped elements from the horizontal does take place owing to the curved path of the free ends of the actuating levers to which ends the tops of the upwardly extending limbs of the L-shaped elements are pivoted.

The lateral limbs 38 of these L-shaped transmission elements extend underneath the aforementioned key slides 22 each of which accordingly extends across all said lateral limbs 38, and the depending lugs 31 on the key slides operate the actuating levers by depressing said lateral limbs and thereby pushing the vertical limbs 34 down and so rocking the actuating levers 19.

By means of the above described arrangement of the L-shaped transmission elements the leverage on the actuating levers is the same, whatever the position of the corresponding key slide. For example the lateral limb of the L-shaped transmission element which operates the 11d actuating lever (in either zone) is acted upon by a depending lug on each alternate key slide, yet despite the different distances of said key slides from the said 11d actuating lever the force applied to said lever is the same for all said key slides.

Also during the downward movement of a key slide 22 the meshing segments 25, 26 maintain the outside ends of the slide in the same horizontal plane so that the slide descends horizontally whatever the relative positions, along the slide, of the key through which force is imparted to the slide and the depending lug by which force from the slide is imparted to the key lever.

The frame 33 carrying the key slides and keys is displaceable across the machine by half the pitch of the lateral limbs of the L-shaped elements and when the frame is in position for operating the lower zone actuating levers each lower zone depending lug is disposed over the lateral limb of the L-shaped element connected to the lower zone actuating lever which it has to operate, each upper zone lug, however, being disposed over the space between two adjacent lateral limbs, so that it is ineffective.

When the frame is displaced into the position for operating the upper zone actuating levers, each upper zone depending lug is disposed over the lateral limb of the L-shaped element connected to the upper zone actuating lever which it has to operate, while each lower zone lug is over a space between two lateral limbs and is therefore ineffective.

From the foregoing it will be seen that when the frame 33 carrying the key slides 22 is in the lower zone position in which only the lower zone levers 19 are operated, depression of any key 13 depresses the frame 15$a$ carrying the sensing pins 14 for the lower zone only, the upper zone sensing pin frame 15 remaining ineffective so that the upper zone is not sensed.

The upper portion of each sensing pin is in the form of a flat bar 43 having a recess 44 in the edge facing the keys.

Pivoted at 45 to the machine frame below the actuating levers 19 is an angle plate 46. This angle plate 46 is pivoted to the frame so that when it is rocked about its pivot 45 the upstanding part thereof swings forwardly towards the sensing pins 14. At the top of the upstanding part is pivoted a number of testing pins 47, one for each sensing pin 14, the free ends of said testing pins 47 being disposed normally opposite the recesses 44 in the respective registering elements constituted by the flat upper parts 43 of the sensing pins 14.

The angle member 46 and the testing pins 47 correspond respectively to the members 17 and 19 described in British Patent Specification No. 430,251 and operate in a similar manner.

The testing pins 47 are sprung downwardly and are normally held up by the forked members 48 depending from the actuating levers 19 in which forked members the testing pins rest near their free ends.

Also depending from each actuating lever is a lug 49 adapted to engage with the horizontal part of the angle plate 46 and rock the latter to move its horizontal portion downwardly, thereby bringing all the testing pins 47 forwards.

Thus, with the key-carrying frame in the lower zone position, depression of any given key will tend to move all the sensing pins of the lower zone downwardly and will also tend to permit the corresponding testing pin or pins to move downwardly also, by reason of the downward movement of the corresponding forked member; and in addition will tend to rock the angle plate to move all the testing pins forwardly.

In using the machine a card is inserted in the carriage 11 and the key-carrying frame 33 is set into the upper or the lower zone position according to whether it is desired to verify the perforations in the upper or lower zone of the card. The keys 13 are depressed in accordance with the arrangement of perforations which should be in the card if it has been correctly punched. If a key 13 is depressed and the correct perforation is present then the corresponding zone pin frame 15, 15$a$ will move down but all the pins 14 therein except that corresponding to the perforation will be held up, while the pin corresponding to the perforation will go down through the card. The depression of the key 13 permits the corresponding testing pin 47 to move downwardly and the depending lug 49 of the actuating lever 19 will rock the angle plate 46 thereby moving all the testing pins 47 forwardly.

All those testing pins corresponding to the sensing pins which have been held up will also have remained up since their keys have not been depressed. Also, the testing pin corresponding to the sensing pin which has moved down will also have moved down since its key has been depressed.

Thus, the ends of the testing pins 47 will all remain opposite the recesses 44 in the corresponding registering elements constituted by the flat upper parts 43 of the sensing pins and all the testing pins 47 will be able to move forward into these recesses, so that the key 13 can be depressed to its fullest extent, thereby rocking the angle plate 46 to its maximum extent.

When the angle plate 46 is thus rocked to its fullest extent it operates the escapement mechanism in the manner explained below to advance the card carriage one column pitch, to present the next column for sensing.

If the hole which should be present has been omitted or is in another position, then the sensing pin corresponding to the key which has been depressed will remain up and the corresponding testing pin will be obstructed by engaging the edge of the registering element below the recess, thereby preventing the angle plate from being rocked sufficiently to operate the escapement.

Also, if there is another hole in the half-column in addition to the correct hole, the pin corresponding to this erroneous hole will have moved down, but its corresponding testing pin will have remained up, and, therefore, will be unable to move forwardly, so that again the escapement mechanism cannot operate.

During these operations on the lower zone of the card the upper zone sensing pin frame remains up and therefore the testing pins, which still operate in a complete group without being split, are not obstructed in the upper zone because no pin thereof is moved and the recesses in the upper zone pin are opposite the corresponding testing pins.

After the lower zone has been completely verified the key-carrying frame is moved over into the upper zone position and verification of the upper zone holes is carried out in the manner described above for the lower zone holes. During this operation the lower zone sensing pin frame remains stationary, only the upper zone pin frame being operated.

The escapement mechanism is operated from the angle plate 46 in the manner described in Specification No. 430,251 and a space key 12 is provided for actuating the escapement mechanism where there is a blank space in any half column. Since in the cards on which the present machine is intended to operate, each zonal column is only half a full card column, there may be a hole in a half column in one zone, while the corresponding half-column in the other zone is blanks. Accordingly, when moving the key-carrying frame 33 from the upper to the lower zone position or vice versa, it is necessary to change over the action of the space key 12. To this end, a space lever 50 is provided for each of the two pin-carrying frames 15, 15a, the action of each of these levers being similar to that of the space key lever in Specification No. 430,251.

Pivoted on a transverse shaft 51 is an arm 52 which overlies another lever 53 actuated by the space key, and hereinafter referred to as the space key lever, so that when the space key 12 is depressed the arm 52 is rocked. This arm has an extension 54 on the other side of the shaft which is connected by a link 55 to the space lever 50 of one zone. The other space lever 50 is connected by a link 56 to an arm 57 fixed to the transverse shaft 51, said transverse shaft also having fixed thereto an arm 58 extending alongside the arm already referred to.

When the key-carrying frame 33 is in one position the space key lever 53 extends under the arm 52 which is pivoted on the shaft 51 so that depression of the space key 12 actuates said pivoted arm to operate the space lever 50 corresponding to the zone for which the key-carrying frame is set. When the key-carrying frame is moved over into its other position, then the space key lever 53 moves clear of the arm 52 pivoted on the shaft 51 and under the arm 58 which is fixed to the shaft, thereby depression of the space key 12 actuates the space lever 50 corresponding to the other zone.

In order to operate the key-carrying frame 33 with a safety action, the following mechanism is provided:

Mounted in the machine frame transversely of the key-carrying frame 33 and adjacent thereto is a slide 59 which is urged towards one side of the machine (e. g. to the right) by a spring 60. Pivoted on a fixed bracket 61 adjacent this slide 59 and in a plane parallel thereto is a substantially vertical lever 62 which extends above and below its pivot 63 and has a slot 64 in its upwardly extending portion and also a slot 65 in its downwardly extending portion.

The slot 65 in the downwardly extending portion engages a pin 66 on the key-carrying frame 33, and a pin 67 on a pivoted operating lever 68 engages in the slot 64 in the upwardly directed portion.

The pivot 63 for the slotted lever 62 is located on the longitudinal axis of the spring urged slide 59 and said slotted lever 62 is connected by a short link 69 to said slide at a point on the longitudinal axis thereof.

When the key-carrying frame 33 is in its left-hand position, the slotted lever 62 is at the end of its clockwise movement and the short link 69 is over to one side of its dead centre position. If now, by means of the operating lever 68, the slotted lever 62 is moved counterclockwise, it does not at first move the key-carrying frame 33 because the slot 65 in the downwardly extending part of said slotted lever is wide enough to permit lost motion.

As the slotted lever 62 is thus rocked the short link 69 swings into its dead centre position thereby pushing the slide 59 to the left and extending the spring 60 attached thereto. Further rocking of the slotted lever 62 then brings the short link 69 beyond its dead centre whereupon the spring 60 pulls the slide 59 back towards the right. Since the short link 59 is now on the opposite side of its dead centre from that on which it was during the leftward movement of the slide, the rightward movement of the latter, acting through the short link pulls the slotted lever 62 still further counterclockwise thereby completing its movement in that direction. The slot 65 in the downwardly extending portion of the rocking lever is of a width such that the lost motion therein is not fully taken up until after the short link 69 has passed its dead centre position, so that during the completion of the counterclockwise movement of the slotted lever, one side of the slot is engaging the pin on the key-carrying frame, whereby, during the final part of the counterclockwise movement of said slotted lever the key-carrying frame is moved transversely into its other position under the action of the spring acting on the slotted lever through the aforementioned slide and short link.

The operation in the opposite direction is similar, and it will be noted that in both directions of movement the manually initiated movement of the slotted lever 62 is completed by the action of the spring 60 pulling on the slide 59, although said spring always pulls in the same direction.

The operating lever 68 is connected with a handle 70 pivoted at 71 to a bracket 72 mounted on the machine frame and locating marks 73, 73a are provided on the cover of the key-carrying frame 33 to align with one or other of the fixed index positions Upper and Lower marked on the machine frame.

An inking device may be provided for marking the cards, column by column as each column is tested, to give an indication as to which columns have been verified.

The inking device comprises an ink container 74 secured to the cover for the key-carrying frame 33 so as to be movable therewith. From the container 74 two coil-spring covered wicks 75 extend and have their free ends clamped in a bracket 76 secured respectively to the pin carrying frames 15, 15a for movement therewith. As shown in the drawings, the lower ends of the wick are disposed to mark a card to indicate a column verified next before the one being verified by the downward movement of the pin-carrying frame but it will be appreciated that, if desired, the location of the free ends of the wick may be so arranged that each column is ink-marked at the time when it is verified.

We claim:

1. A machine for verifying the data perforated in statistical record cards of the kind divided into upper and lower zones each containing a number of zonal columns equal to the number of full columns in the undivided card but each of half the length of a full column, and wherein data is recorded in any zonal column by punching either one or two holes therein, said machine comprising a column of settable elements allocated to each zone, each of said columns containing as many settable elements as there are index-positions in a zonal column of the card, a zonal column of sensing pins corresponding to each column of settable elements, each of said zonal columns of sensing pins being independently operable to sense a column of its associated zone, and serving, when so operated, to set the corresponding zonal column of settable elements in accordance with the perforations in the sensed zonal columns, a group of actuators allocated to each zone, one actuator allocated to each index position in the corresponding zone and each actuator of any zone serving, when operated, to actuate all the sensing pins of the associated zone, and a single group of keys for operating both groups of actuators, said group of keys being displaceable as a whole out of co-operative relation with one group of actuators and into co-operative relation with the other group and vice versa, each key being depressible for operating one or more actuators of the group in cooperative relation with said group of keys and a testing member allocated to each settable element, each operable by the corresponding actuator to test the position of its respective settable element and give an indication as to whether said position is correct.

2. A verifying machine according to claim 1 wherein each actuator is in the form of a pivoted lever having hingedly depending from its free end an L-shaped transmission element guided for substantially vertical bodily movement, and each key serves to depress an associated one of a group of slides disposed in a key-carrying frame and transversely of the laterally extending limbs of said transmission elements, each of said slides carrying one or two depending lugs to engage the lateral limbs of the transmission element or elements hinged to the appropriate actuator or actuators of one group, and also a corresponding number of depending lugs for engaging the lateral limbs of the transmission element or elements hinged to the appropriate actuator or actuators of the other group, the first mentioned lug or lugs being spaced along the slide in relation to the second mentioned lug or lugs in such a way as to be in register with the transmission element or elements when the second mentioned lug or lugs is or are out of register therewith and vice versa.

3. A verifying machine according to claim 2, wherein each slide is guided for vertical sliding movement and during such movement has its guided edges maintained in substantially parallel relation with the guides by pivoted intermeshing toothed segments having pins engaging in slots formed at opposite ends of the slide and located in the same horizontal plane.

4. A verifying machine according to claim 1, wherein the group of keys is mounted in a displaceable key-carrying frame movable from one operative position to the other by a manually operable handle connected with the frame through an operating link, a pivoted slotted lever, a spring controlled slide, and a short link connecting the lever and slide, whereby the initial operating engagement of said parts is effected by said handle but the resulting movement of the key-carrying frame is effected by the spring controlling said slide.

5. A verifying machine according to claim 1, wherein a space key is provided, said space key being arranged to actuate either of the zonal columns of sensing pins according as to which column is in operative connection with the group of keys and to move the testing members towards the pins, but not to depress said testing members, whereby if the space key is depressed and a pin or pins of the column is or are not impeded the corresponding testing member will be unable to move, thereby indicating an error.

6. A verifying machine according to claim 5 wherein two space levers, one for each zonal column of sensing pins, are connected with the space key through the medium of a space key lever which is movable relatively to the space levers and, according to the position of the group of keys, is aligned with one or other of the space levers.

7. A verifying machine according to claim 1, wherein a marking device movable with each of the zonal columns of sensing pins is arranged to engage a card at each operation of its associated zonal column of sensing pins.

ARTHUR THOMAS.
FREDERICK SIDNEY RHODES.
MAURICE RICHARD BROWN.

REFERENCES CITED

The following references are of record in the file of this patent:

UNITED STATES PATENTS

| Number | Name | Date |
|---|---|---|
| 2,031,569 | Maul | Feb. 18, 1936 |
| 2,055,186 | Thomas | Sept. 22, 1936 |
| 2,282,072 | Maul | May 5, 1942 |